Jan. 9, 1940.   S. N. SENNA   2,186,213
DEVICE FOR TESTING THE RUPTURING STRENGTH OF SHEET MATERIAL
Filed Aug. 10, 1935   2 Sheets-Sheet 1

INVENTOR,
Samuel N. Senna,
BY
Frank E. Haskell
ATTORNEY.

Jan. 9, 1940.   S. N. SENNA   2,186,213
DEVICE FOR TESTING THE RUPTURING STRENGTH OF SHEET MATERIAL
Filed Aug. 10, 1935   2 Sheets-Sheet 2

INVENTOR,
Samuel N. Senna,
BY
Frank E. Haskell
ATTORNEY.

Patented Jan. 9, 1940

2,186,213

UNITED STATES PATENT OFFICE 2,186,213

DEVICE FOR TESTING THE RUPTURING STRENGTH OF SHEET MATERIAL

Samuel N. Senna, Chicopee, Mass., assignor to B. F. Perkins & Sons, Inc., Chicopee, Mass., a corporation of Massachusetts Application August 10, 1935, Serial No. 35,606

9 Claims. (Cl. 265—14)

This invention relates to apparatus for testing the strength of paper, textile fabrics and similar materials. There has been, for a number of years, apparatus of this character on the market known as the Mullen tester. The general features of this type of testing device are disclosed in the patent issued to Mullen on Feb. 22, 1887, No. 358,056, in the patent issued to Putnam on June 8, 1909, No. 924,625, in the patent issued to Cleveland on April 30, 1912, No. 1,025,110, and in the patent issued to Senna on March 4, 1930, No. 1,749,265.

One of the problems involved in the satisfactory operation of such apparatus is to determine just the right amount of force with which the material being tested should be clamped in place. If the paper is not clamped tightly enough there is a tendency for it to slip as the pressure on the diaphragm rises toward the ultimate rupturing pressure. If, on the other hand, it is clamped too tightly, which is a common tendency with the heavier and thicker materials such as corrugated boards, the material is apt to be crushed which also leads to erroneous results in the test. Heretofore, there have been two different ways of clamping the paper or other material being tested. For those materials requiring a very considerable pressure, a screw operated by a hand wheel, as shown in the patent to Putnam, has been considered preferable. For materials requiring only a moderate pressure a cam lever, as shown in the patent to Cleveland, operates to clamp the paper much more quickly. In this type of clamping device, the clamping force is substantially proportional to the force of a spring which operates on one end of the clamping lever and causes the lever at the other end to press the "clamping foot" downwardly against the paper. The disadvantage of this method is that the force is always proportional to the strength of the spring regardless of whether the paper is a light tissue paper or a heavy kraft paper.

It is an object of the present invention to provide clamping means in apparatus of the foregoing character which shall exert a pressure proportional to the force being employed to rupture the paper under test.

It is a further object of the invention to increase the clamping force automatically and gradually as the hydraulic pressure used for testing increases so that at no time will the clamping force be greatly in excess of that actually required at that moment.

A secondary object of the invention resulting from the foregoing specific objects is the provision of a single testing apparatus that can be used for both light and relatively weak papers and also for heavy strong papers without the necessity of changing to a different type of testing device such as changing from the clamping mechanism of the spring type shown by Cleveland to the clamping mechanism of the screw type shown by Putnam.

It is a still further object of the invention to provide a device which will operate to clamp the sample being tested in place and also to apply the hydraulic pressure for causing the rupturing test both with the same movement of the operating handle and thus accomplish such test in much less time than when two operations are necessary.

These and other objects of the invention will readily appear to those skilled in the art to which it appertains by a consideration of the following description of one embodiment thereof taken in connection with the accompanying drawings in which Fig. 1 is a side elevation partly in section of a paper testing device embodying the invention;

Figure 1:
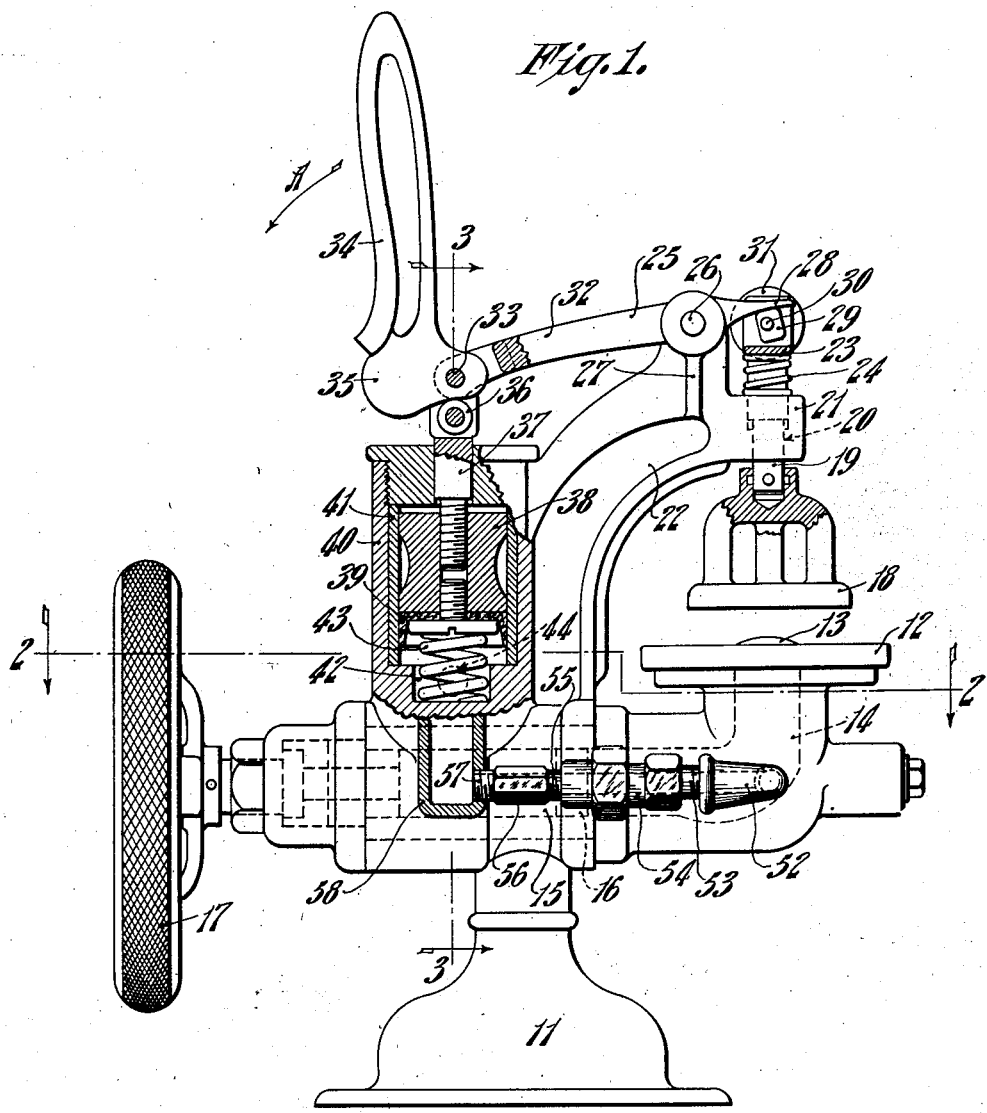
Figure 2:
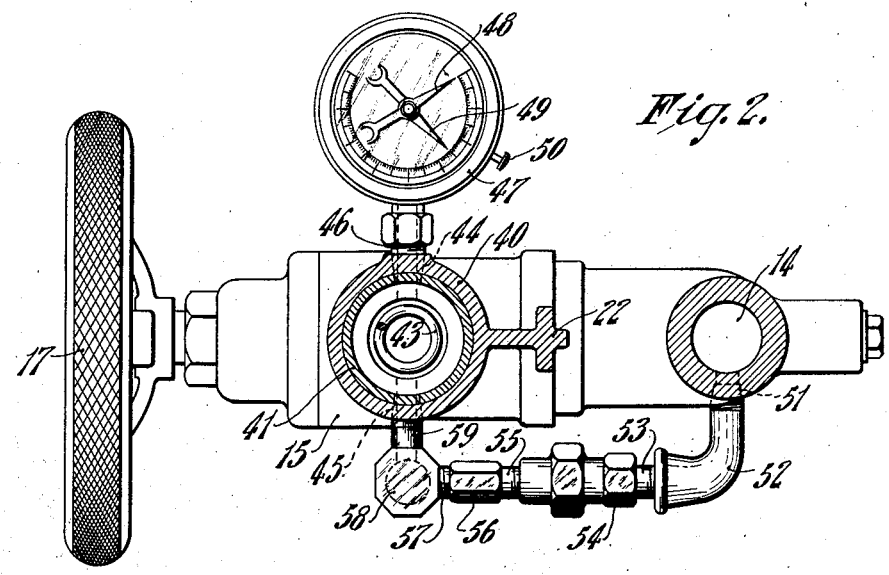
Fig. 2 is a horizontal section taken on the line 2—2 of Fig. 1.
Figure 3:
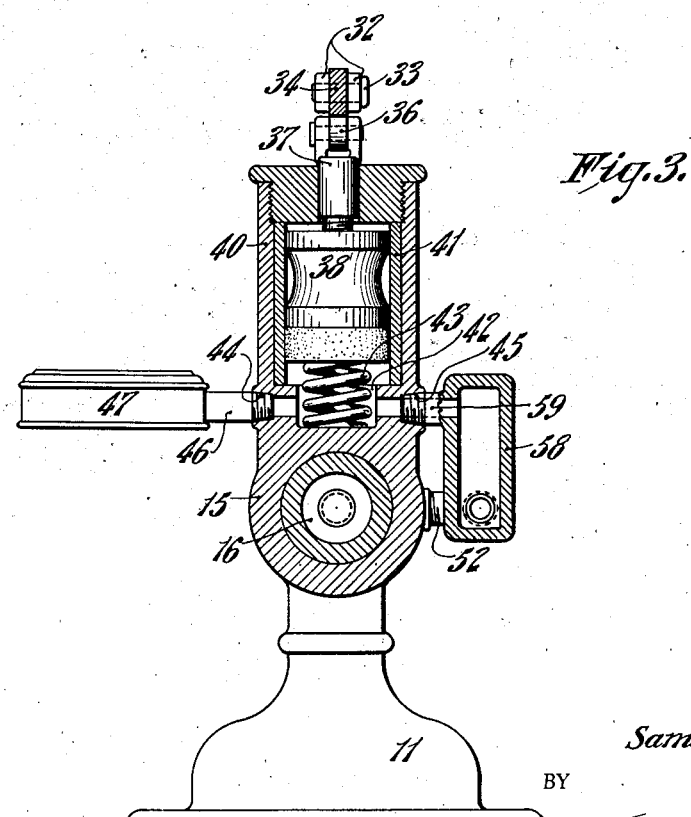
Fig. 3 is a vertical section taken on the line 3—3 of Fig. 1.

Referring to the drawings more in detail the reference character 11 indicates a supporting pedestal or base. An apertured platform 12 is connected with the pedestal 11 by a portion which extends horizontally to the right as seen in Fig. 1. This platform is adapted to support a specimen of the material to be tested and has an aperture therein closed at its upper end by a rubber diaphragm 13. The aperture in the platform beneath the rubber diaphragm 13 is filled with glycerin or other suitable liquid and is connected by a vertical passage 14 to a horizontal cylinder 15. A piston 16 is movable longitudinally within the cylinder and is connected by a screw-threaded member to a hand wheel 17 so that by turning the hand wheel the piston may be moved to apply pressure to the liquid, distend the rubber diaphragm 13, and rupture the material under test.

There is shown at 18 suitable clamping means, usually a member called a tripod, having an aperture in the lower portion thereof to correspond to the aperture in the platform which is closed by the rubber diaphragm 13. The tripod is connected at its upper end with a rod 19. This rod 19 is mounted for vertical movement in an aperture 20 in a projection 21 extending outwardly horizontally from the upper end of an arm 22 which extends upwardly from the base 11 and outwardly over the platform 12. The rod 19 is provided with an enlarged portion 23 near its upper end and a compression spring 24 is positioned between the enlarged portion 23 and the projection 21 so as to retract the rod 19 after the clamping force has been removed.

The necessary clamping force is applied to the rod 19 by means of a clamping lever 25 which is pivoted intermediate its ends on a pin 26 mounted in an upwardly extending portion 27 of the arm 22. The arm of the lever 25 which extends to the right, indicated by the reference character 28, presses downwardly on the upper end of the rod 19 preferably exerting its force through a cam 29 which is carried by a pin 30 mounted in the upper bifurcated end of the rod 19 and adjustable in position by means of a milled adjusting disc 31. By means of this adjustable cam the position of the clamping tripod with respect to the position of the clamping lever 25 may be changed to accommodate the thickness of different kinds of material being tested and positioned between the tripod and the supporting platform.

The other lever arm 32 of the clamping lever 25 is provided with a pivotal pin 33 which is pivotally connected with one end of a clamping handle 34. This clamping handle is provided with a cam 35 which presses against a roller 36 and as the handle 34 is pressed downward in the direction indicated by the arrow A the lever arm 32 is forced upward and the opposite lever arm 28 downward against the cam 29 and the tripod is thus pressed downward onto the platform or onto any material positioned thereon.

The roller 36 is pivotally mounted on the upper end of a rod 37 which is connected at its lower end with a piston 38. This piston is provided with a suitable packing 39 such as leather and travels up and down in a cylinder 40 which is secured to or formed integral with the arm 22. The cylinder may be provided with a suitable lining 41 to prevent leakage of the glycerin through the porous cast iron and has a recess 42 in the lower end thereof in which is positioned a compression spring 43 which presses upwardly against the piston 38.

The lower portion of the cylinder 40 may be provided with two tapped openings 44 and 45 on opposite sides thereof. The opening 44 is connected by means of a threaded pipe 46 to a pressure gauge 47 which is preferably of the type having two indicating pointers 48 and 49 the latter being moved up the scale by the former and remaining at the highest pressure attained until reset by a button 50 provided for that purpose.

The lower portion of the vertical passage 14 is also provided with a tapped opening 51 which is connected to the tapped opening 45 in the lower portion of the cylinder 40 by any suitable means such as an elbow 52, threaded pipe nipple 53, pipe union 54, threaded pipe nipple 55, coupling 56, threaded pipe nipple 57, vertical chamber 58, and threaded member 59. By means of this set of connections the hydraulic pressure of the glycerin beneath the diaphragm 13 is communicated to the cylinder 40 and is acting at all times on the piston 38. The total pressure acting upwardly through the rubber diaphragm 13 against the tripod 18 is proportional to the pressure per square inch of the liquid, to the total hydraulic pressure acting upwardly on the piston 38 and, except for the force of spring 43, to the total pressure acting upwardly on the lever arm 32, to the total pressure acting downwardly through the cam 29, rod 19, and through the tripod 18 on the material being tested. Furthermore the proportions of the parts are so chosen that the total pressure acting upwardly on the diaphragm and tripod is multiplied slightly and a somewhat greater pressure acts downwardly on the rod 19 and the tripod 18.

In operation a piece of paper or other material is placed on the platform 12 and the clamping handle is moved in the direction of the arrow A in Fig. 1. Because of the action of the cam 35 against the roller 36 the lever arm 32 is moved upwardly and the lever arm 28 downwardly. The lever arm 28 presses on the cam 29 and this force is transmitted to the rod 19 and clamping tripod 18 which is lowered against the action of the spring 24 to clamp the paper in place. It is to be understood that the force of the spring 43 imposes a certain amount of clamping force on the tripod regardless of whether there is any hydraulic pressure acting on the piston 38. After the paper has been clamped in place the hand wheel 17 is then turned gradually thus moving the piston 16 longitudinally of the cylinder 15 and, through the glycerin or other fluid therein, pushing the rubber diaphragm upwardly against the sheet of material being tested. At the same time the pressure of the fluid, acting through the piston 38, rod 37, lever 25, cam 29 and rod 19, pushes downwardly on the tripod 18 with a force proportional to but slightly greater than the force with which the diaphragm is pushing upwardly. When the sheet of material being tested is ultimately ruptured the hydraulic pressure immediately drops to a value that is only a small fraction of the pressure up to that moment and the pointer 48 swings back to zero leaving the pointer 49 at the highest indication attained to register the rupturing strength of the sheet.

It is clear that there has thus been provided means for clamping the sheet being tested with a force that gradually increases with the hydraulic pressure and therefore with the force necessary for holding the sheet on the platform. However this force is never much greater than the force necessary for that particular hydraulic pressure on the diaphragm. Successive sheets being tested may vary widely in their strength but the operator is sure of having all the clamping force necessary as each sheet has the rupturing pressure applied thereto. He also knows that no force is being applied unless and until such force is necessary because of the increased pressure beneath the rubber diaphragm.

In operating the device for testing paper not requiring a very great rupturing force an alternate method of operation may be employed whereby other unique advantages are attained. If the hand wheel is in about the proper position for testing a thin sheet of paper, such as tissue paper, the operation of the clamping handle for the purpose of clamping the paper will also apply a hydraulic pressure to the liquid beneath the piston 38 which hydraulic pressure is communicated to the rubber diaphragm 13 and causes it to rupture the paper. The position of the pointer 49 on the gauge 47 may then be read, the single operation of the clamping handle 34 serving both to clamp the paper and to apply the pressure and make the test. For reasons not necessary to discuss this simultaneous clamping and testing operation does not seem to work out so satisfactorily with heavier papers and the use of the hand wheel 17 is preferable but the single operation of the clamping handle 34 gives very accurate results and is capable of very much faster testing with light papers than devices heretofore used which require two separate operations. The statement that heavier papers are not so satisfactorily tested is not intended by way of limitation but merely by way of general information. Tests up to approximately thirty pounds per square inch have been made with accurate results and it is very probable that this figure can be raised very substantially without making any material changes in the construction as herein described.

If a testing device were intended to be used exclusively for testing light weight papers then the hand wheel 17 and associated piston and cylinder would be unnecessary. A pump, such as that shown at P in the patent issued to Senna on March 14, 1933, No. 1,901,359, may be employed for adjusting the fluid so that the subsequent movement of the clamping lever will apply the hydraulic pressure for rupturing the specimen. By thus dispensing with the hand wheel 17 and associated piston and cylinder the construction of the apparatus is simplified and the cost of manufacture reduced.

It is to be understood that the foregoing description is for purposes of illustration only and various changes may be made therein without departing from the spirit and scope of the invention as defined in the subjoined claims.

I claim:

1. In a device for testing the rupturing strength of a specimen of sheet material, a supporting platform for said specimen having an aperture therein, means movably positioned in said aperture and adapted to be forced against said specimen until it is ruptured, hydraulic means for forcing said movable means against said specimen, clamping means for holding said specimen on said platform, a cylinder rigidly connected with said platform, a spring-pressed piston positioned in said cylinder, connections between said hydraulic means and said cylinder whereby a force proportional to the rupturing force acts on said piston in the same direction as the spring, and connections between said piston and said clamping means whereby the force of said spring and the hydraulic force acting on said piston are together proportional to the force acting on said clamping means and are counterbalanced thereby.

2. In a device for testing the rupturing strength of a specimen of sheet material, a supporting platform for said specimen having an aperture therein, means movably positioned in said aperture and adapted to be forced against said specimen until it is ruptured, hydraulic means for forcing said movable means against said specimen, clamping means for holding said specimen on said platform, a cylinder rigidly connected with said platform, a spring-pressed piston positioned in said cylinder, connections between said hydraulic means and said cylinder whereby a force proportional to the rupturing force acts on said piston in the same direction as the spring, and a lever connecting said piston and said clamping means whereby the force of said spring and the hydraulic force acting on said piston produce together a moment in said lever equal and opposite to the moment produced by the reaction force of said clamping means.

3. A device as set forth in claim 2 further characterized by a manually operable cam positioned to act on said lever to complete said leverage connections whereby said connections may be manually completed or disconnected for the purpose of changing specimens.

4. In a device for testing the rupturing strength of a specimen of sheet material, a supporting pedestal, a horizontal lever pivotally supported intermediate its two ends on said pedestal, a platform having an aperture therein positioned beneath one arm of said lever and rigidly connected with said pedestal, a clamping member for holding said specimen on the platform operably connected with that arm of the lever which is above the platform, means for applying hydraulic pressure through said aperture to rupture said specimen, a vertically disposed cylinder positioned beneath the other arm of said lever and rigidly connected with said pedestal, a piston in said cylinder, connections between said piston and the arm of the lever positioned thereabove for transmitting the reaction force of the clamping means to the piston, two means for applying forces to said piston to counterbalance said reaction force, one of said means comprising hydraulic pressure beneath said piston connected with the hydraulic rupturing means and the other means comprising a spring pressing upwardly against said piston, and a manually operable clamping handle having means associated therewith for completing the connections between said piston and the arm of the lever whereby the operation of said handle applies a clamping pressure to said clamping member that is counterbalanced in part by the force of the spring and in part by the hydraulic pressure.

5. In a device for testing the rupturing strength of a specimen of sheet material, a supporting platform for said specimen having an aperture therein, means movably positioned in said aperture and adapted to be forced against said specimen until it is ruptured, means for applying force to said movable means, a clamping member for holding said specimen on said platform, a manually operable clamping handle movable into either of two positions in each of which said handle maintains itself until manually changed, connections between said clamping handle and said clamping member whereby the movement of said handle into one position moves said member against said specimen and holds it in place and the movement of said handle into the other position moves said member away from said specimen, resilient means connected to said clamping member by the movement of said clamping handle into clamping position so as to impose on said member an initial force which remains invariable after the handle is in its self-maintaining clamping position, and connections between said force applying means and said member for adding to the initial force of the resilient means a force proportional to and somewhat greater than the force acting on said specimen through said aperture.

6. In a device for testing the rupturing strength of a specimen of sheet material, a supporting platform for said specimen having an aperture therein, means movably positioned in said aperture and adapted to be forced against said specimen until it is ruptured, a clamping member movable toward said supporting platform for holding said specimen in place, manually operable means for moving said member toward said platform to press said specimen thereagainst, and connections between said manually operable means and said specimen rupturing means for transmitting to said rupturing means a portion of the reaction force with which the platform pushes against said clamping member.

7. In a device for testing the rupturing strength of a specimen of sheet material, a supporting platform for said specimen having an aperture therein, means movably positioned in said aperture and adapted to be forced against said specimen until it is ruptured, a clamping member movable toward said supporting platform for holding said specimen in place, manually operable means for moving said member toward said platform to press said specimen thereagainst, connections between said manually operable means and said specimen rupturing means for transmitting to said rupturing means a portion of the reaction force with which the platform pushes against said clamping member, and resilient means connected to said connections for applying a force thereto in opposition to said reaction force.

8. In a device for testing the rupturing strength of a specimen of sheet material, a supporting platform for said specimen having an aperture therein, means movably positioned in said aperture and adapted to be forced against said specimen until it is ruptured, manually operable clamping means for holding said specimen on said platform, means for locking said clamping means in clamping position and for applying thereto approximately the same predetermined initial clamping force at each operation thereof, and means for increasing the force with which the specimen is clamped on the platform an amount proportionate to the force with which said movable means is forced against said specimen.

9. In a device for testing the rupturing strength of a specimen of sheet material, a supporting platform for said specimen having an aperture therein, means movably positioned in said aperture and adapted to be forced against said specimen until it is ruptured, means for applying force to said rupturing means, a clamping member for holding said specimen in place on said platform, resilient means for applying a predetermined force to said clamping member, connections between said resilient means and said clamping member having two different self-maintaining positions, in one position said resilient means exerting its force to hold said clamping member against said specimen and in the other position said resilient means being disconnected from said clamping member, means between said force applying means and said connections whereby a force is added to that of said resilient means which is proportional to said rupturing force and is connected to said clamping member by means of the same connections as said resilient means, and manually operable means for moving said connections into either of said two positions.

SAMUEL N. SENNA.